United States Patent
Defosse et al.

(10) Patent No.: US 9,829,055 B2
(45) Date of Patent: Nov. 28, 2017

(54) ELECTROMECHANICAL ACTUATOR COMPRISING A MECHANICAL ROLLER TORQUE LIMITER

(71) Applicant: SAFRAN ELECTRONICS & DEFENSE, Boulogne Billancourt (FR)

(72) Inventors: Xavier Defosse, Boulogne Billancourt (FR); Jerome Piaton, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 15/323,855

(22) PCT Filed: Jun. 10, 2015

(86) PCT No.: PCT/EP2015/062920
§ 371 (c)(1),
(2) Date: Jan. 4, 2017

(87) PCT Pub. No.: WO2016/005134
PCT Pub. Date: Jan. 14, 2016

(65) Prior Publication Data
US 2017/0152902 A1 Jun. 1, 2017

(30) Foreign Application Priority Data
Jul. 8, 2014 (FR) ...................................... 14 56588

(51) Int. Cl.
*B60W 10/18* (2012.01)
*F16D 47/02* (2006.01)
(Continued)

(52) U.S. Cl.
CPC .............. *F16D 47/02* (2013.01); *B64C 13/50* (2013.01); *F16D 7/10* (2013.01); *F16D 28/00* (2013.01);
(Continued)

(58) Field of Classification Search
CPC .......... F16D 47/02; F16D 41/00; F16D 28/00; F16D 7/10; F16D 65/28; F16D 67/02; F16D 55/24; F16D 61/064
See application file for complete search history.

(56) References Cited

U.S. PATENT DOCUMENTS 4,980,591 A 12/1990 Takanashi et al.
6,012,985 A * 1/2000 Sukup ...................... F16D 7/10
464/152

(Continued)

FOREIGN PATENT DOCUMENTS

JP 02-19619 A 1/1990

*Primary Examiner* — David J Hlavka
(74) *Attorney, Agent, or Firm* — Muncy, Geissler, Olds & Lowe, P.C.

(57) ABSTRACT

An electromechanical actuator comprising a body and an electric motor driving at least one motion transmission element connected to the body via a brake device, a mechanical torque limiter with rollers, and a unidirectional transmission member, the brake device including an electrical activator member so that when the activator member is powered, the unidirectional transmission member is released relative to the body, and when the activator member is not powered, the unidirectional transmission member is secured to the body and opposes pivoting of the transmission element in one direction of rotation up to a maximum transmissible torque defined by the torque limiter.

6 Claims, 1 Drawing Sheet

(51) Int. Cl.
 *F16D 41/00* (2006.01)
 *F16D 28/00* (2006.01)
 *F16D 7/10* (2006.01)
 *F16D 55/24* (2006.01)
 *F16D 65/28* (2006.01)
 *F16D 67/02* (2006.01)
 *B64C 13/50* (2006.01)
 *F16D 41/064* (2006.01)

(52) U.S. Cl.
 CPC ............ *F16D 41/00* (2013.01); *F16D 55/24* (2013.01); *F16D 65/28* (2013.01); *F16D 67/02* (2013.01); *F16D 41/064* (2013.01)

(56) References Cited

U.S. PATENT DOCUMENTS

| | | | |
|---|---|---|---|
| 8,992,378 B2 * | 3/2015 | Holmes | B60K 6/387 192/84.6 |
| 2002/0025880 A1 | 2/2002 | Kusumoto et al. | |
| 2003/0194263 A1 * | 10/2003 | Ueda | F16D 7/024 403/2 |
| 2004/0195070 A1 * | 10/2004 | Kao | F16D 13/583 192/109 F |
| 2011/0259703 A1 * | 10/2011 | Kuwabara | F16D 27/112 192/18 B |
| 2015/0292601 A1 * | 10/2015 | Tesar | F16D 13/26 475/149 |

* cited by examiner

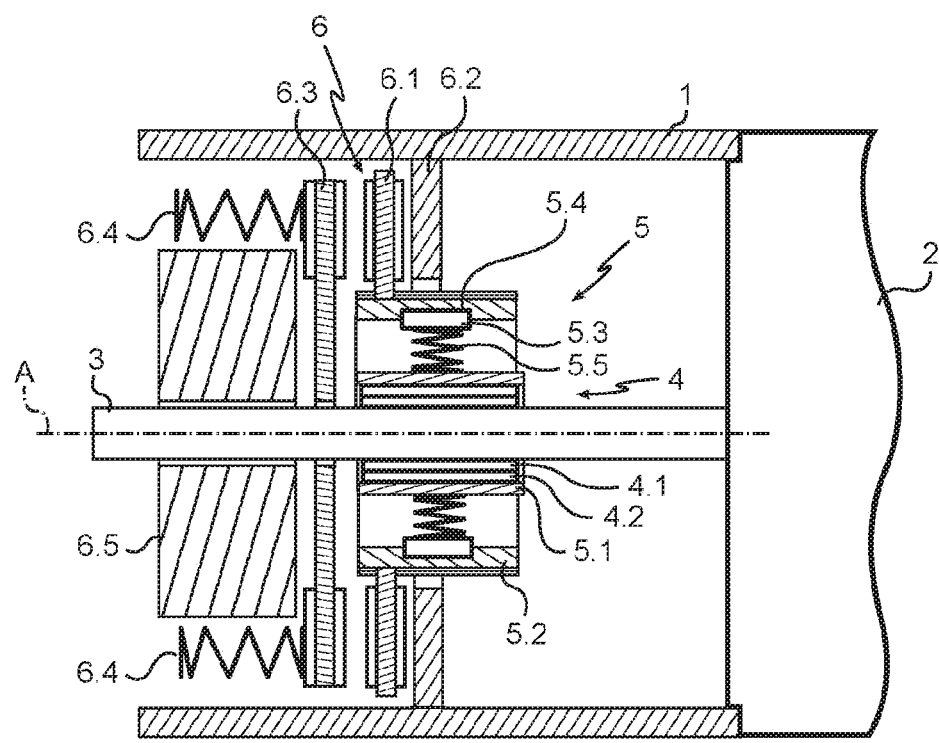

ELECTROMECHANICAL ACTUATOR COMPRISING A MECHANICAL ROLLER TORQUE LIMITER

BACKGROUND OF THE INVENTION

Field of the Invention

The present invention relates to moving a movable element relative to a fixed body, and more precisely it relates to an electromechanical actuator suitable for use by way of example in aviation, and in particular for moving a flight control surface relative to the structure of an aircraft. By way of example, such a flight control surface may be an aileron, an elevon, a flap, a rudder control surface, an elevator, a spoiler, . . . .

Aircraft generally comprise a fixed structure, such as a wing or a tail, having flight control surfaces hinged thereto that are mounted on the fixed structure so as to pivot. Actuators connect the movable surfaces mechanically to the fixed structure and are themselves connected so as to be controlled by a control unit on which the pilot of the aircraft acts.

Description of Related Art

Actuators are known that comprise an electric motor and a motion transmission element driven by a rotor of the electric motor. Generally, in such actuators, the electric motor has a stator secured to a body that is fastened to the fixed structure, and a transmission element drives an inlet element of a transmission system such as a screw-and-nut assembly and/or stepdown gearing, with an outlet element fastened to the flight control surface so that a movement of the outlet element causes the flight control surface to pivot between a deployed position and a retracted position or a neutral position.

In the event of a failure of the motor or of its control means, and depending on the type of flight control surface, it may be preferable to leave the flight control surface free to move towards one of its positions while preventing the flight control surface from moving towards the second of its positions, e.g. under the effect of aerodynamic forces. For this purpose, the transmission assembly generally includes an overrunning clutch or "freewheel" that can become clutched in the event of motor failure in order to oppose pivoting of the transmission element in the direction corresponding to the flight control surface moving towards its second position.

When the freewheel is clutched, the flight control surface tending to move towards its deployed position exerts a torque on the transmission element, which torque is transmitted to the body. Under certain circumstances, the torque can be large and risks damaging the entire transmission system all the way to the structure of the aircraft.

BRIEF SUMMARY OF THE INVENTION

An object of the invention is to remedy that drawback.

To this end, the invention provides an electromechanical actuator comprising a body, an electric motor having a stator fastened to the body, and at least one motion transmission element rotatably connected to a rotor of the motor, said element being connected to the fixed body via a unidirectional transmission member and a brake device. The actuator includes a mechanical torque limiter with rollers and the brake device includes an electrical activator member so that when the activator member is powered, the unidirectional transmission member is released relative to the body, and when the activator member is not powered, the unidirectional transmission member is secured to the body and opposes pivoting of the transmission element in one direction of rotation up to a maximum transmissible torque defined by the mechanical torque limiter with rollers.

Thus, in the event of excessive torque, the torque limiter allows the transmission element to slide relative to the body, thereby limiting any risk of damaging the body.

Advantageously, the mechanical torque limiter with rollers is mounted between the body and the unidirectional transmission member.

This embodiment has a structure that is particularly compact and makes it possible to incorporate the brake device, the unidirectional transmission member, and the mechanical torque limiter with rollers in a single subassembly.

Preferably, the mechanical torque limiter with rollers is mounted between the brake device and the unidirectional transmission member.

This arrangement makes it simple to incorporate the mechanical torque limiter with rollers.

Other characteristics and advantages of the invention appear on reading the following description of a particular, non-limiting embodiment of the invention.

BRIEF DESCRIPTION OF THE DRAWINGS

Reference is made to the accompanying drawings, in which the sole FIGURE is a diagrammatic longitudinal section view of an actuator of the invention.

DETAILED DESCRIPTION OF THE INVENTION

The actuator of the invention is described herein in an application to moving a flight control surface relative to the structure of an aircraft. The flight control surface is movable between a deployed position and a neutral or retracted position.

With reference to the sole FIGURE, the electromechanical actuator comprises a body 1 and an electric motor 2 having a stator fastened to the body 1 and a rotor rotatably connected to a motion transmission element.

The body 1 has conventional means for fastening it to the structure of an aircraft.

The electric motor 2 is powered by a control unit (not shown) that is connected to the electricity network of the aircraft for its own power supply and for powering the actuator, and that is connected to the cockpit of the aircraft to receive orders therefrom for deploying or retracting the flight control surface.

In this example, the motion transmission element is a shaft 3 pivotally mounted in the body 1 and connected to the flight control surface via a motion transmission assembly (not shown). By way of example, the motion transmission assembly comprises a stepdown device and/or a motion transformation device such as a screw-and-nut assembly, and has an inlet element rotatably connected to the shaft 3 and an outlet element e.g. connected to the free end of a lever that is connected to the flight control surface. The shaft 3 is guided in rotation relative to the body 1 by bearings (not shown) and it is connected to the body 1 via a unidirectional transmission member, specifically in this example a freewheel given overall reference 4, a torque limiter given overall reference 5, and a brake device given overall reference 6.

The freewheel 4 comprises an inner portion 4.1 secured to the shaft 3, an outer portion 4.2 pivotally mounted on the inner portion 4.1, and a ratchet assembly allowing the outer portion 4.2 to turn in only one direction of rotation.

The torque limiter 5 is a mechanical torque limiter with rollers including an inner sleeve 5.1 and an outer sleeve 5.2. The inner sleeve 5.1 is fastened to the outer portion 4.2 of the freewheel 4 and the outer sleeve 5.2 is connected to rotate with an inner ring 6.1 of the brake device 6.

In this example, the inner sleeve 5.1 is in the form of a tube centered on the axis of rotation A of the shaft 3.

The outer sleeve 5.2 is also in the form of a tube centered on the axis A: the outer sleeve 5.2 surrounds the inner sleeve 5.1 and is pivotally received in a bearing secured to the body 1. The outside surface of the outer sleeve 5.2 is fluted to receive the inner ring 6.1 in axial sliding.

The torque limiter 5 further comprises rollers 5.3 interposed between the inner sleeve 5.1 and the outer sleeve 5.2, each roller 5.3 being suitable for moving along an inside surface of the outer sleeve 5.2 and for being received in one of the housings 5.4 formed along the circumference of said inside surface.

The torque limiter 5 further comprises springs 5.5, each spring 5.5 being associated with one of the rollers 5.3 in such a manner as to exert a constant force on said roller 5.3 in order to press the roller 5.3 against the inside surface of the outer sleeve 5.2.

In this example, the springs 5.5 are arranged in such a manner as to extend radially (i.e. perpendicularly to the axis of rotation A of the shaft 3) between the inner sleeve 5.1 and the outer sleeve 5.2, a first end of each spring 5.5 being secured to the inner sleeve 5.1 and a second end being connected to one of the rollers 5.3 in order to come to press said roller 5.3 against the inside surface of the outer sleeve 5.2.

The radial force exerted by the springs 5.5 on the rollers 5.3 defines a maximum transmissible torque, i.e. the maximum torque that can be transmitted from the inner sleeve 5.1 to the outer sleeve 5.2: so long as this maximum transmissible torque is not exceeded, the springs 5.5 hold the rollers 5.3 in place in the housings 5.4 and the sleeves 5.1 and 5.2 remain secured to each other; as soon as the maximum transmissible torque is exceeded, the springs 5.5 are compressed in such a manner as to allow the rollers 5.3 to exit the housings 5.4 and to allow a relative movement of the two sleeves between each other by means of the movement of the rollers 5.3 on the inside surface of the outer sleeve 5.2.

In addition to the movable ring 6.1, the brake device 6 has an outer ring 6.2 that is rigidly fastened to the body 1 (more precisely, the outer ring 6.2 in this example is a portion of the body 1) and an outer ring 6.3 fastened to the body 1 with axial clearance. The inner ring 6.1 is fastened with axial clearance to the outer sleeve 5.2 (the inner ring 6.1 is more precisely engaged in the outside surface of the outer sleeve 5.2) and has a portion with faces that are each provided with a friction lining and that extend between friction linings carried by the outer rings 6.2 and 6.3. Springs 6.4 extend between the body 1 and the outer ring 6.3 to clamp the inner ring 6.1 between the outer rings 6.3 and 6.2. The brake device 6 also has an electrical activator member 6.5 in the form of a solenoid dimensioned so that when it is powered it attracts the outer ring 6.3 and moves it away from the inner ring 6.1 against the force exerted by the springs 6.4.

In operation, when the activator member 6.5 is powered, the shaft 3 can pivot in both directions of rotation (it should be observed that in the direction passed by the freewheel 4, the motor 2 delivers little or no drive to the inner ring 6.1 and the torque limiter 5) and, when the activator member 6.5 is not powered, the freewheel 4 opposes rotation of the shaft 3 in one of the two directions of rotation. Thus, when the activator member 6.5 is powered, the electric motor 2, which is also powered, drives the shaft 3 to turn in either of its directions of rotation.

When the activator member 6.5 is not powered, the electric motor 2 is likewise not powered so that only aerodynamic forces acting on the flight control surface can cause the shaft 3 to pivot. Because of the freewheel 4 opposing turning of the shaft 3 in one of the two directions of rotation, the shaft 3 prevents the flight control surface from moving away from its neutral position towards its deployed position, whereas the flight control surface is left free to move towards its neutral position. Nevertheless, if the aerodynamic forces acting on the flight control surface exert a torque on the shaft 3 that is greater than the maximum torque that can be transmitted between the sleeves 5.1 and 5.2 of the torque limiter 5, the inner sleeve 5.1 will pivot relative to the outer sleeve 5.2, thus allowing the shaft 3 to turn and allowing the flight control surface to move towards its deployed position. As a result, the torque limiter 5 limits the torque that can be transmitted to the structure of the aircraft and to the body 1 via the shaft 3, the freewheel 4, and the brake device 6 when the activator member is not powered.

Naturally, the invention is not limited to the embodiments described but encompasses any variant coming within the ambit of the invention as defined by the claims.

In particular, the mechanical torque limiter with rollers may be mounted downstream from the one-way transmission member or between the brake device and the body.

The mechanical torque limiter with rollers could be in an arrangement that differs from that described. In particular, although in this example the springs extend radially between the inner sleeve and the outer sleeve, the torque limiter could be shaped in such a manner that the springs extend axially between the two sleeves (i.e. they extend along the axis A).

The one-way transmission member may make use of pawls, rollers, or of chocking elements.

The invention claimed is:

1. An electromechanical actuator comprising a body, an electric motor having a stator fastened to the body, and at least one motion transmission element rotatably connected to a rotor of the motor, said element being connected to the body via a unidirectional transmission member and a brake device, the actuator being characterized in that the actuator includes a mechanical torque limiter with rollers and in that the brake device comprises an electrical activator member so that when the electrical activator member is powered, the unidirectional transmission member is released relative to the body, and when the electrical activator member is not powered, the unidirectional transmission member is secured to the body and opposes pivoting of the transmission element in one direction of rotation up to a maximum transmissible torque defined by the mechanical torque limiter with rollers.

2. The actuator according to claim 1, wherein the mechanical torque limiter with rollers is mounted between the body and the unidirectional transmission member.

3. The actuator according to claim 2, wherein the mechanical torque limiter with rollers is mounted between the brake device and the unidirectional transmission member.

4. The actuator according to claim 3, wherein the mechanical torque limiter with rollers comprises an inner sleeve connected to rotate with a first portion of the unidirectional transmission member, an outer sleeve connected to rotate with a first portion of the brake device, and rollers interposed between the inner sleeve and the outer sleeve, the torque limiter further including springs exerting a constant force on the various rollers in order to temporarily secure the inner sleeve and the outer sleeve as long as the maximum transmissible torque has not been exceeded.

5. The actuator according to claim 4, wherein the springs are arranged in such a manner as to extend radially between the inner sleeve and the outer sleeve, a first end of each spring being secured to the inner sleeve and a second end of each spring coming to press a roller against an inside surface of the outer sleeve.

6. The actuator according to claim 1, wherein the unidirectional transmission member is a freewheel.

\* \* \* \* \*